United States Patent
Aguilar et al.

(10) Patent No.: US 9,472,222 B2
(45) Date of Patent: Oct. 18, 2016

(54) VIBRATION MITIGATION FOR A DATA STORAGE DEVICE

(71) Applicant: Western Digital Technologies, Inc., Irvine, CA (US)

(72) Inventors: John Aguilar, Irvine, CA (US); Sean Kelly, Aliso Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 227 days.

(21) Appl. No.: 14/300,439

(22) Filed: Jun. 10, 2014

(65) Prior Publication Data
US 2015/0331637 A1 Nov. 19, 2015

Related U.S. Application Data (60) Provisional application No. 61/994,330, filed on May 16, 2014.

(51) Int. Cl.
*G06F 3/06* (2006.01)
*G11B 5/55* (2006.01)
*G11B 5/012* (2006.01)

(52) U.S. Cl.
CPC ........... *G11B 5/5582* (2013.01); *G06F 3/0619* (2013.01); *G06F 3/0659* (2013.01); *G06F 3/0676* (2013.01); *G06F 3/0679* (2013.01); *G11B 5/012* (2013.01)

(58) Field of Classification Search
CPC ............... G06F 3/0614; G06F 3/0619; G06F 12/0866; G06F 3/0631; G06F 3/0659; G06F 3/0676; G06F 3/0679; G06F 3/0688; G11B 27/36; G11B 2220/2516; G11B 5/012; G11B 5/5582
See application file for complete search history.

(56) References Cited

U.S. PATENT DOCUMENTS

| | | | |
|---|---|---|---|
| 6,856,556 B1 | 2/2005 | Hajeck | |
| 7,126,857 B2 | 10/2006 | Hajeck | |
| 7,411,757 B2 | 8/2008 | Chu et al. | |
| 7,430,136 B2 | 9/2008 | Merry, Jr. et al. | |
| 7,447,807 B1 | 11/2008 | Merry et al. | |
| 7,477,477 B2 | 1/2009 | Maruchi et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |

(Continued)

OTHER PUBLICATIONS

Alain Chahwan, et al., U.S. Appl. No. 13/772,295, filed Feb. 20, 2013, 26 pages.

*Primary Examiner* — Zhuo Li (57) ABSTRACT

Vibration mitigation for a Data Storage Device (DSD) including a disk for storing data and a solid-state memory for storing data. An input is received indicating a vibration condition for the DSD and a write command is received from a host to store data in the DSD. At least a portion of the data for the write command is stored in a dedicated segment of the solid-state memory based on the received input indicating the vibration condition.

30 Claims, 7 Drawing Sheets

(56) References Cited

U.S. PATENT DOCUMENTS

| | | |
|---|---|---|
| 7,962,792 B2 | 6/2011 | Diggs et al. |
| 8,037,348 B2 * | 10/2011 | Wei .................... G06F 11/1441 360/31 |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,271,692 B1 | 9/2012 | Dinh et al. |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,699,171 B1 | 4/2014 | Boyle |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2006/0288157 A1 * | 12/2006 | Kinoshita ............. G06F 3/0613 711/112 |
| 2010/0174849 A1 | 7/2010 | Walston et al. |
| 2010/0250793 A1 | 9/2010 | Syu |
| 2011/0099323 A1 | 4/2011 | Syu |
| 2011/0238887 A1 | 9/2011 | Bazzani |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0031298 A1 | 1/2013 | Tan et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

* cited by examiner

VIBRATION MITIGATION FOR A DATA STORAGE DEVICE

CROSS-REFERENCE TO RELATED APPLICATION

This application claims the benefit of U.S. Provisional Application No. 61/994,330, filed on May 16, 2014, which is hereby incorporated by reference in its entirety.

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk. However, when a DSD with a disk is subjected to vibration, writing data on the disk can become more prone to errors since the vibration can cause movement of the head while writing data on the disk.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
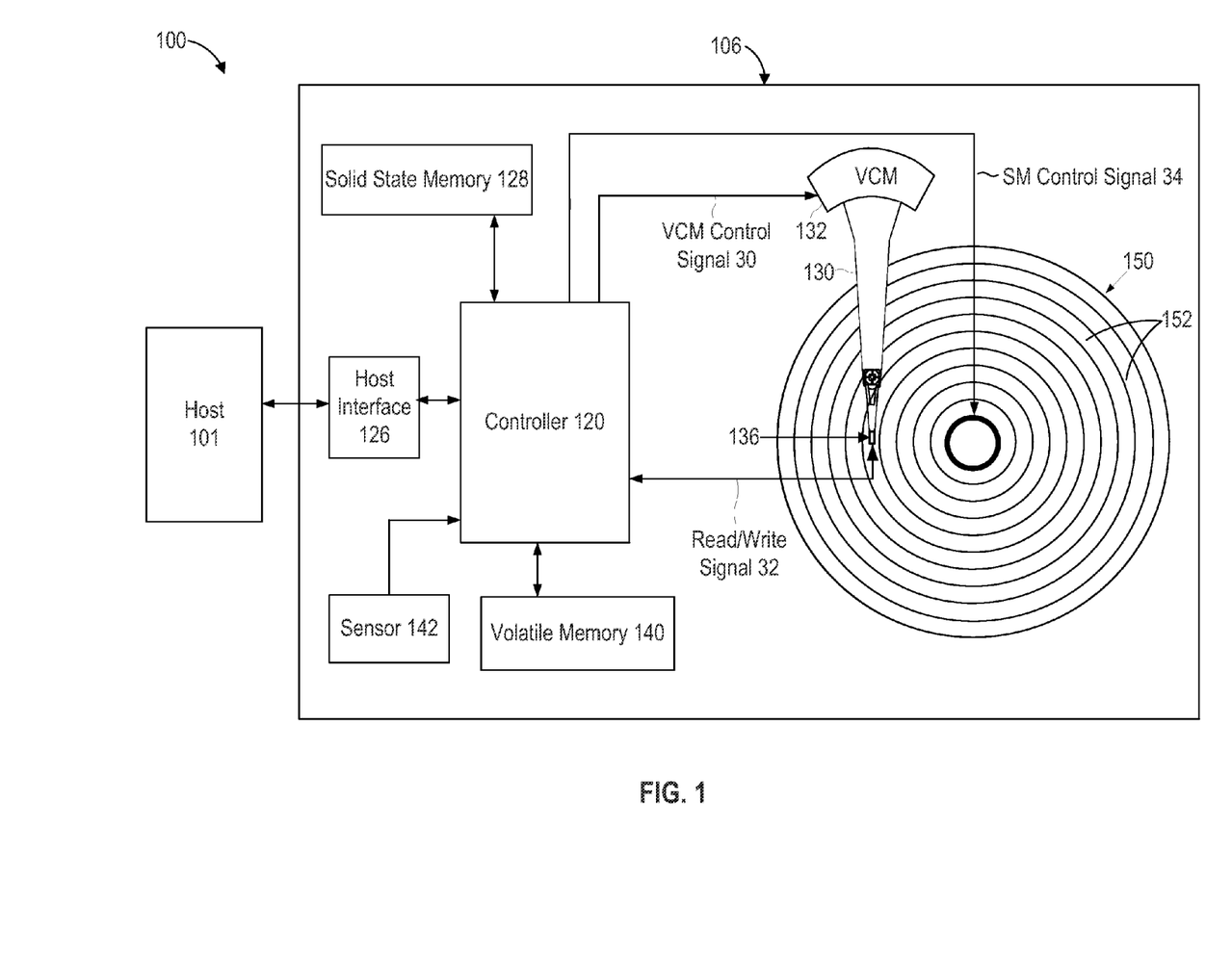
FIG. 1 is a block diagram depicting a Data Storage Device (DSD) according to an embodiment.

FIG. 1 shows computer system 100 according to an embodiment which includes host 101 and Data Storage Device (DSD) 106. Computer system 100 can be, for example, a computer system (e.g., server, desktop, mobile/laptop, tablet, smartphone, etc.) or other electronic device such as a digital video recorder (DVR). In this regard, computer system 100 may be a stand-alone system or part of a network. Those of ordinary skill in the art will appreciate that system 100 and DSD 106 can include more or less than those elements shown in FIG. 1 and that the disclosed processes can be implemented in other environments.

In the example embodiment of FIG. 1, DSD 106 includes both solid-state memory 128 and disk 150 for storing data. In this regard, DSD 106 can be considered a Solid State Hybrid Drive (SSHD) in that it includes both solid state Non-Volatile Memory (NVM) media and disk NVM media. In other embodiments, each of disk 150 or solid-state memory 128 may be replaced by multiple Hard Disk Drives (HDDs) or multiple Solid State Drives (SSDs), respectively, so that DSD 106 includes pools of HDDs and/or SSDs.

DSD 106 includes controller 120 which includes circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). As will be appreciated by those of ordinary skill in the art, host interface 126 can be included as part of controller 120.

Sensor 142 detects a vibration condition of DSD 106 and provides an input to controller 120 based on the detected condition. In this regard, sensor 142 can include an accelerometer or other type of sensor capable of detecting vibration. In other embodiments, sensor 142 may be omitted and host 101 may provide an input to DSD 106 indicating a vibration condition of computer system 100 or DSD 106.

In the example of FIG. 1, disk 150 is rotated by a spindle motor (not shown). DSD 106 also includes head 136 connected to the distal end of actuator 130 which is rotated by Voice Coil Motor (VCM) 132 to position head 136 in relation to disk 150. Controller 120 can control the position of head 136 and the rotation of disk 150 using VCM control signal 30 and SM control signal 34, respectively.

As appreciated by those of ordinary skill in the art, disk 150 may form part of a disk pack with additional disks radially aligned below disk 150. In addition, head 136 may form part of a head stack assembly including additional heads with each head arranged to read data from and write data to a corresponding surface of a disk in a disk pack.

Disk 150 includes a number of radial spaced, concentric tracks 152 for storing data on a surface of disk 150. Each track 152 is divided into a number of sectors (not shown) that are spaced circumferentially along the tracks.

In some implementations, the tracks on disk 150 are written by a write element of head 136 using Shingled Magnetic Recording (SMR) so as to overlap adjacent tracks. SMR provides a way of increasing the amount of data that can be stored in a given area on disk 150 by overlapping tracks like roof shingles. The non-overlapping portion then serves as a narrow track that can be read by a read element of head 136.

Although a higher number of tracks per inch are ordinarily possible with SMR, the higher density of tracks on disk 150 can make the writing of tracks on disk 150 more susceptible to errors when DSD 106 is vibrated during a vibration condition. In one example, a vibration condition can occur from sound generated by speakers of computer system 100. With a tight tolerance for track locations in modern DSDs, relatively small vibrations can cause head 136 to move off track while attempting to write data and thereby cause a write error.

To mitigate the foregoing vulnerability to vibration, and as discussed below in more detail, controller 120 can direct the storage of data during a vibration condition to solid-state memory 128 instead of disk 150 to help avoid write errors.

While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

Volatile memory 140 can include, for example, a Dynamic Random Access Memory (DRAM) which can be used by DSD 106 to temporarily store data. Data stored in volatile memory 140 can include data read from NVM media (e.g., disk 150 or solid-state memory 128), data to be written to NVM media, instructions loaded from firmware of DSD 106 for execution by controller 120, or data used in executing firmware of DSD 106.

In operation, host interface 126 receives read and write commands from host 101 via host interface 126 for reading data from and writing data to the NVM media of DSD 106. In response to a write command from host 101, controller 120 may buffer the data to be written for the write command in volatile memory 140.

For data to be written to disk 150, controller 120 can encode the buffered data into write signal 32 which is provided to head 136 for magnetically writing data to the surface of disk 150.

In response to a read command for data stored on disk 150, controller 120 positions head 136 via VCM control signal 30 to magnetically read the data stored on the surface of disk 150. Head 136 sends the read data as read signal 32 to controller 120 for decoding, and the data is buffered in volatile memory 140 for transferring to host 101.

For data to be stored in solid-state memory 128, controller 120 receives data from host interface 126 and may buffer the data in volatile memory 140. In one implementation, the data is then encoded into charge values for charging cells (not shown) of solid-state memory 128 to store the data.

In response to a read command for data stored in solid-state memory 128, controller 120 in one implementation reads current values for cells in solid-state memory 128 and decodes the current values into data that can be transferred to host 101. Such data may be buffered by controller 120 before transferring the data to host 101 via host interface 126.

Figure 2:
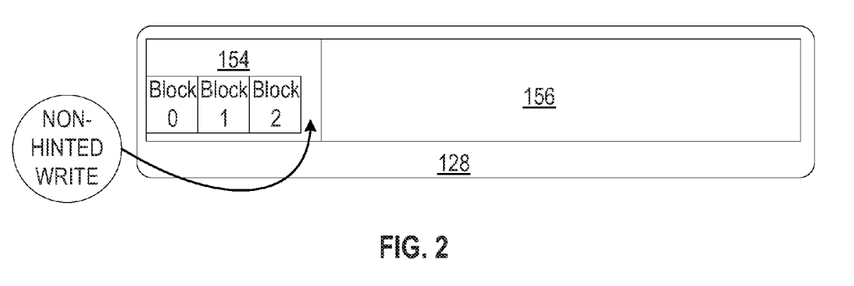
FIG. 2 is a diagram depicting the storage of data in a dedicated segment of a solid-state memory according to an embodiment.

FIG. 2 is a diagram depicting the storage of data in dedicated segment 154 of solid-state memory 128 according to an embodiment. As discussed in more detail below, dedicated segment 154 can be reserved for storing data during a vibration condition.

In the example of FIG. 2, solid-state memory 128 also includes cache segment 156 for storing data. In one implementation, cache segment 156 can be used to store copies of high priority data or data that is read frequently from disk 150 so that such data can be quickly accessed without having to spin up disk 150 to an operating speed or reposition head 136 over a particular track on disk 150. In other implementations, cache segment 156 can be used to store data from deferred write commands for later storage on disk 150.

As shown in FIG. 2, dedicated segment 154 already includes data blocks 0, 1 and 2 when a non-hinted write command is performed to store data in dedicated segment 154. Non-hinted write commands are sent from host 101 without an indication as to where to store the data for the write command. In one embodiment, segment 154 may be used to store such non-hinted commands when the storage device is experiencing vibration.

The host 101 may also send hinted write commands indicating a priority (e.g., level 0-7) associated with a write command. In this regard, host 101 may assign a priority to different write commands based on an algorithm of host 101. In one example, data that is expected to be frequently accessed is assigned a high priority while data that is expected to be accessed less frequently is assigned a lower priority. In such an example, controller 120 may treat the priority assigned by host 101 as an indication as to whether to store the data of the write command in solid-state memory 128 or disk 150. For example, during operation without a vibe condition, controller 120 may ordinarily direct data for storage in solid-state memory 128 for a hinted write command and direct data for storage on disk 150 for a non-hinted write command. The data for the hinted write commands can be stored in cache segment 156. In one embodiment, where the amount of data for hinted commands exceeds the capacity of cache segment 156, data for the higher priority hinted commands may be retained while data for lower priority hinted commands may be synchronized with a corresponding copy of the data in disk 150.

When there is a vibration condition, controller 120 may store data for non-hinted write commands in dedicated segment 154 of solid-state memory 128 instead of on disk 150 to reduce the likelihood for a write error, as shown in FIG. 2.

In other embodiments, host 101 may not provide any hinting as to where to store data for write commands and controller 120 may store the data for all write commands in dedicated segment 154 during the vibration condition. Similarly, controller 120 may also store data in dedicated segment 154 during a vibration condition without consideration as to whether the write command includes any hinting from host 101.

As discussed below, by storing data for non-hinted write commands in dedicated segment 154 during a vibration condition, it is ordinarily possible to better manage the data stored in solid-state memory 128. In one aspect, after the vibration condition ends, controller 120 may synchronize the data stored in solid-state memory 128 and disk 150 so that the most recent version of data written in solid-state memory 128 is used to update an older version of the data on disk 150. In addition, a remaining data storage capacity of dedicated segment 154 or cache segment 156 may also be used to throttle or delay performance of write commands in solid-state memory 128 during the vibration condition so as to better conserve the data storage capacity of solid-state memory 128.

Figure 3:
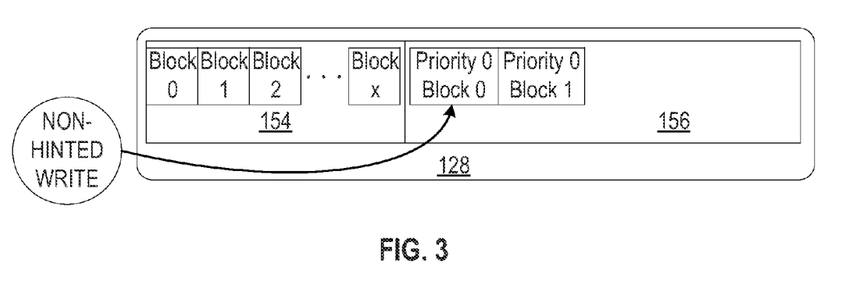
FIG. 3 is a diagram depicting the storage of data in a cache segment of a solid-state memory according to an embodiment.

FIG. 3 is a diagram depicting the storage of data for a non-hinted write command when a remaining data storage capacity for solid-state memory 128 has reached or is outside of a first threshold according to an embodiment. As shown in FIG. 3, dedicated segment 154 already includes data blocks 0 to x and data for the non-hinted write is redirected to cache segment 156. The first threshold in the example of FIG. 3 can be a data storage capacity for dedicated segment 154 left over after storing data blocks 0 to x. In other implementations, the first threshold can include an amount of data already stored in dedicated segment 154 for data blocks 0 to x.

Controller 120 may also assign the redirected data stored in cache segment 156 a low priority as shown in FIG. 3 with blocks 0 and 1 having a priority of 0, which may correspond to a lowest priority level of hinted commands in one embodiment. In this manner, a non-hinted command during a vibration condition may be treated as if it were a hinted command with a low priority. Controller 120 may also identify the redirected data for synchronization between cache segment 156 and disk 150 after the vibration condition has ended.

Figure 4:
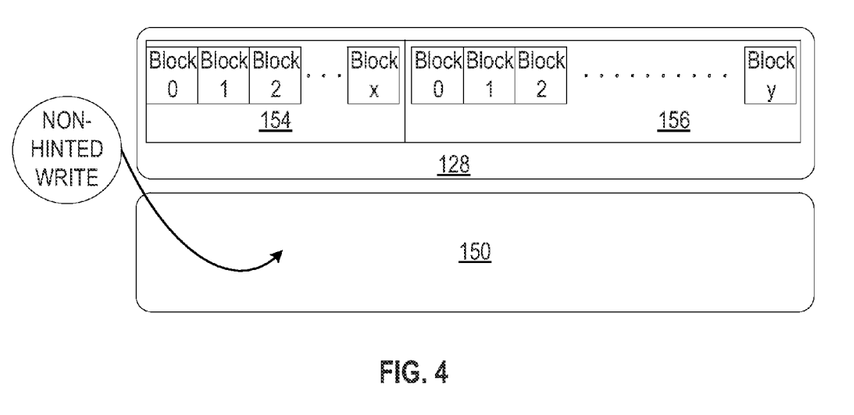
FIG. 4 is a diagram depicting the storage of data on a disk according to an embodiment.

FIG. 4 is a diagram depicting the storage of data for a non-hinted write command on disk 150 after a remaining data storage capacity for dedicated segment 154 has reached or is outside of a first threshold and after a remaining data storage capacity for cache segment 156 has reached or is outside of a second threshold. As shown in FIG. 4, dedicated segment 154 already stores data for data blocks 0 to x and cache segment 156 already stores data for data blocks 0 to y. The second threshold in the example of FIG. 4 can be a remaining data storage capacity for cache segment 156 left over after storing data blocks 0 to y. In other implementations, the second threshold can include an amount of data stored in cache segment 156 for data blocks 0 to y.

Although storing data on disk 150 during a vibration condition can be more susceptible to write errors, there may not be enough remaining data storage capacity in solid-state memory 128 to accommodate data for new write commands. In this regard, certain embodiments discussed below include a throttling or delaying of a performance of write commands during a vibration condition to reduce the risk of overflowing the capacity of dedicated segment 154 and/or cache segment 156.

Figure 5:
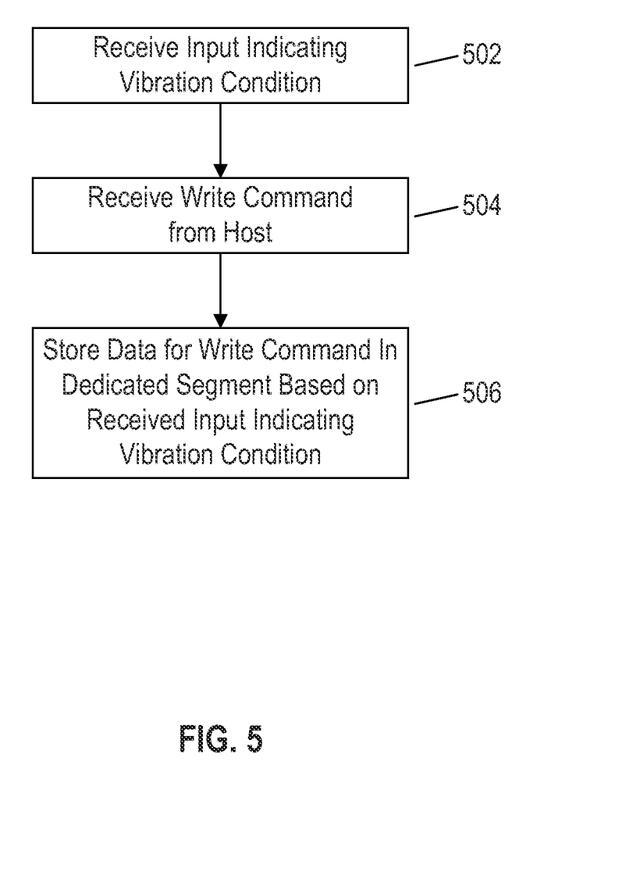
FIG. 5 is a flowchart for write process during a vibration condition according to an embodiment.

FIG. 5 is a flowchart for write process that can be performed by controller 120 during a vibration condition according to an embodiment. The process may be executed by controller 120 as part of a firmware stored in DSD 106 for controlling operation of DSD 106.

In block 502, controller 120 receives an input indicating a vibration condition. As discussed above, the input indicating the vibration condition can come from sensor 142 or from host 101. The input may be a binary value or flag indicating the vibration condition. In other implementations, the input may include a value quantifying the vibration condition. In such an implementation, controller 120 may compare the value to a predetermined value stored as part of a firmware of DSD 106 to determine the existence or extent of the vibration condition.

In block 504, controller 120 receives a write command from host 101 to store data in DSD 106. The write command may be hinted or non-hinted in that host 101 may or may not indicate whether to store data for the write command in solid-state memory 128 or disk 150.

Although the flowchart of FIG. 5 shows block 502 preceding block 504, the order of these blocks may be reversed so that controller 120 receives the write command from host 101 before receiving the input indicating the vibration condition. If controller 120 is in the process of performing a write command to store data on disk 150 when controller 120 receives the input indicating the vibration condition, controller 120 can interrupt the performance of the write command on disk 150 to store a remaining portion of the data for the write command in dedicated segment 154.

In block 506, controller 120 stores data for the write command in dedicated segment 154 based on the input indicating the vibration condition.

Figure 6:
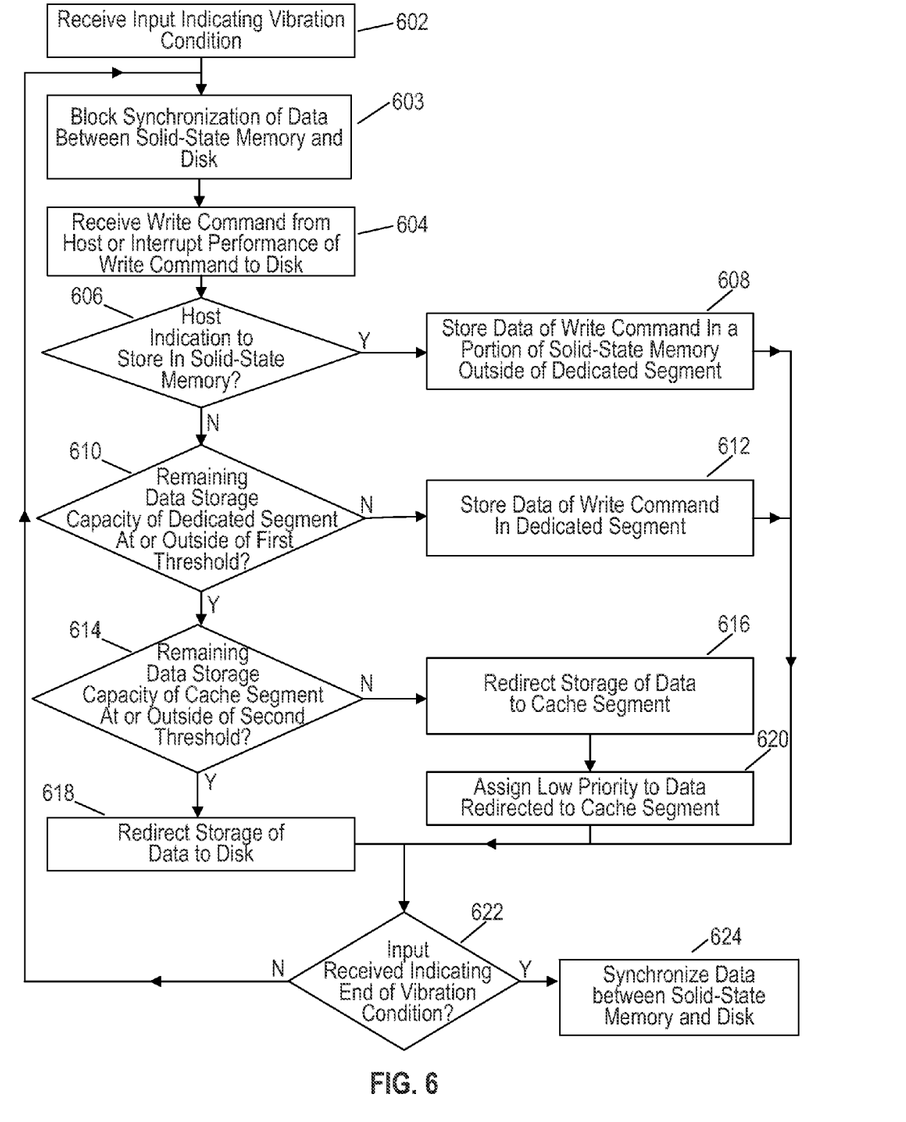
FIG. 6 is a flowchart for a write process during a vibration condition according to another embodiment.

FIG. 6 is a flowchart for a write process that can be performed by controller 120 such as by executing a firmware of DSD 106 according to an embodiment. In FIG. 6, an input from host 101 or sensor 142 is received in block 602 by controller 120 indicating a vibration condition. As with block 502 described above, the input may indicate a vibration condition with a binary value or flag, or the input may indicate the vibration condition with a value quantifying the vibration condition.

In block 603, controller 120 blocks attempts to synchronize data between solid-state memory 128 and disk 150 during the vibration condition. DSD 106 may ordinarily perform a synchronization process between solid-state memory 128 and disk 150 as part of a routine background operation to update disk 150 with deferred writes and data that has more recently been modified in solid-state memory 128. The synchronization can include copying or migrating data that has been deferred from being stored on disk 150.

In one implementation, controller 120 in block 603 may block synchronization by forcing a cache behavior bit in a SATA 3.2 Hybrid Information Feature command from host 101 that would otherwise cause controller 120 to synchronize data between solid-state memory 128 and disk 150. As discussed below with reference to blocks 622 and 624, controller 120 defers relocating or copying data to disk 150 until after the vibration condition has ended.

In block 604, controller 120 receives a write command from host 101 for storing data in DSD 106 or interrupts performance of a write command to store data on disk 150. If controller 120 is already performing a write command to store data on disk 150, controller 120 may treat the data already written on disk 150 as a partial write. In one implementation, controller 120 keeps track of the portions of the data for such a partial write by using a mapping table stored in a volatile memory such as volatile memory 140. The mapping table can relate Logical Block Addresses (LBAs) used by host 101 to corresponding Physical Block Addresses (PBAs) storing the data.

In block 606, controller 120 determines whether an indication from host 101 indicates that data of the write command is to be stored in solid-state memory 128. The indication can include a hinting from host 101 as a part of the write command or as a separate hinting command. As discussed above, the hinting can include a priority level assigned to the data by the host.

If controller 120 determines in block 606 that the indication from host 101 indicates that the data is to be stored in solid-state memory 128, the data of the write command is stored in a portion of solid-state memory 128 outside of dedicated segment 154, such as cache segment 156.

If controller 120 determines in block 606 that the indication from host 101 does not indicate to store the data in solid-state memory 128, controller 120 determines whether a remaining data storage capacity of dedicated segment 154 has reached or is outside of a first threshold. The threshold can be an amount of data or a percentage of the total data capacity of dedicated segment 154. If the remaining data storage capacity has not reached or is not outside of the first threshold, controller 120 stores the data of the write command in dedicated segment 154.

If the remaining data storage capacity of dedicated segment 154 has reached or is outside the first threshold, controller 120 determines in block 614 whether a remaining data storage capacity of cache segment 156 has reached or is outside of a second threshold. If not, controller 120 redirects storage of the data to cache segment 156 in block 616 and assigns a low priority to the redirected data in block 620. For example, controller 120 may assign data redirected to cache segment 156 a low priority of 0.

On the other hand, if controller 120 determines that the remaining data storage capacity of cache segment 156 has reached or is outside of the second threshold, controller 120 redirects storage of the data to disk 150 in block 618.

In block 622, controller 120 checks whether it has received an indication that the vibration condition has ended. If so, controller 120 synchronizes data between solid-state memory 128 and disk 150 in block 624. The synchronization of block 624 can include copying or migrating data stored in dedicated segment 154 to disk 150. In addition, controller 120 in block 624 may also copy or migrate data stored in cache segment 156 that has been redirected from storage in dedicated segment 154 or data that has been otherwise deferred from being stored on disk 150. In one implementation, controller 120 can migrate data from cache segment 156 that has been assigned a low priority (e.g., 0) in block 620. In another implementation, controller 120 may also mark data for deletion in dedicated segment 154 or cache segment 156 that is obsolete or no longer valid.

If controller 120 has not received an indication that the vibration condition has ended, the process returns to block 626 where controller 120 continues to block the synchronization of data between solid-state memory 128 and disk 150.

Figure 7:
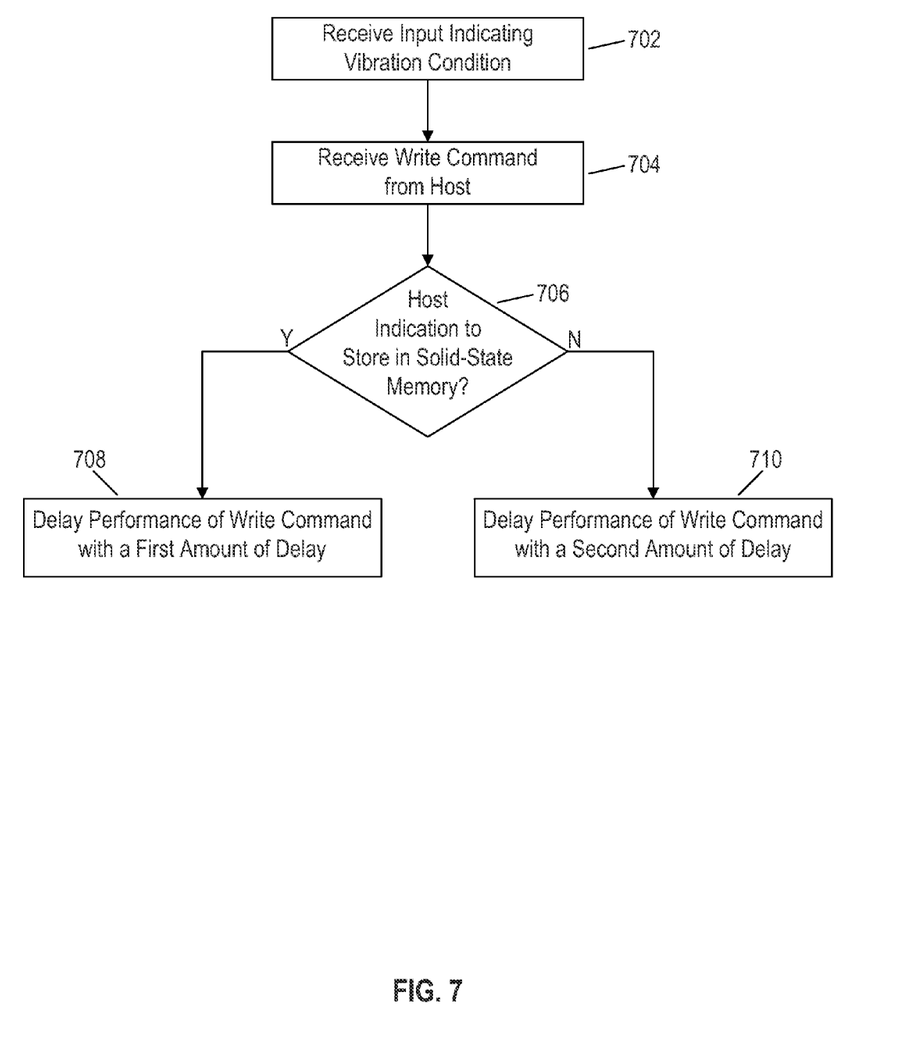
FIG. 7 is a flowchart for a throttling process for storing data during a vibration condition according to an embodiment.

FIG. 7 is a flowchart for a throttling process that can be performed by controller 120 for storing data during a vibration condition according to an embodiment. In block 702, controller 120 receives an input indicating a vibration condition such as from sensor 142 or from host 101. In block 704, controller 120 receives a write command from host 101 for storing data in DSD 106. In block 706, controller 120 determines whether an indication from host 101 indicates whether the data of the write command is to be stored in solid-state memory 128. As noted above, the indication from host 101 can include a priority assigned to the data or a flag to indicate that the data is to be stored in solid-state memory 128.

If it is determined in block 706 that the indication from host 101 indicates that the data is to be stored in solid-state memory 128, controller 120 in block 708 delays performance or throttles performance of the write command with a first amount of delay. In one implementation, the first amount of delay is based on a remaining data capacity of dedicated segment 154 so that performance of the write command is delayed more when dedicated segment 154 has less remaining capacity.

On the other hand, if controller 120 determines that the indication from host 101 indicates that the data is not to be stored in solid-state memory 128, controller 120 delays performance or throttles performance of the write command with a second amount of delay. The second amount of delay can be based on a remaining data capacity of cache segment 156 so that performance of the write command is delayed more when cache segment 156 has less remaining capacity.

By throttling the performance of write commands during the vibration condition, it is ordinarily possible to prevent dedicated segment 154 and/or cache segment 156 from overflowing with data. In addition, the foregoing process of FIG. 7 allows for different or independent throttling for hinted and non-hinted write commands during a vibration condition. For example, during a vibration condition, a non-hinted write command stored in dedicated segment 154 may be delayed more than a hinted write command stored in cache segment 156 if dedicated segment 154 has less remaining data storage capacity than cache segment 156.

As discussed in more detail below with reference to FIG. 8, the throttling of the performance of write commands during the vibration condition can be dynamically adjusted based on different factors such as a remaining data capacity of dedicated segment 154, a remaining data capacity of cache segment 156, or the extent of vibration during the vibration condition.

Figure 8:
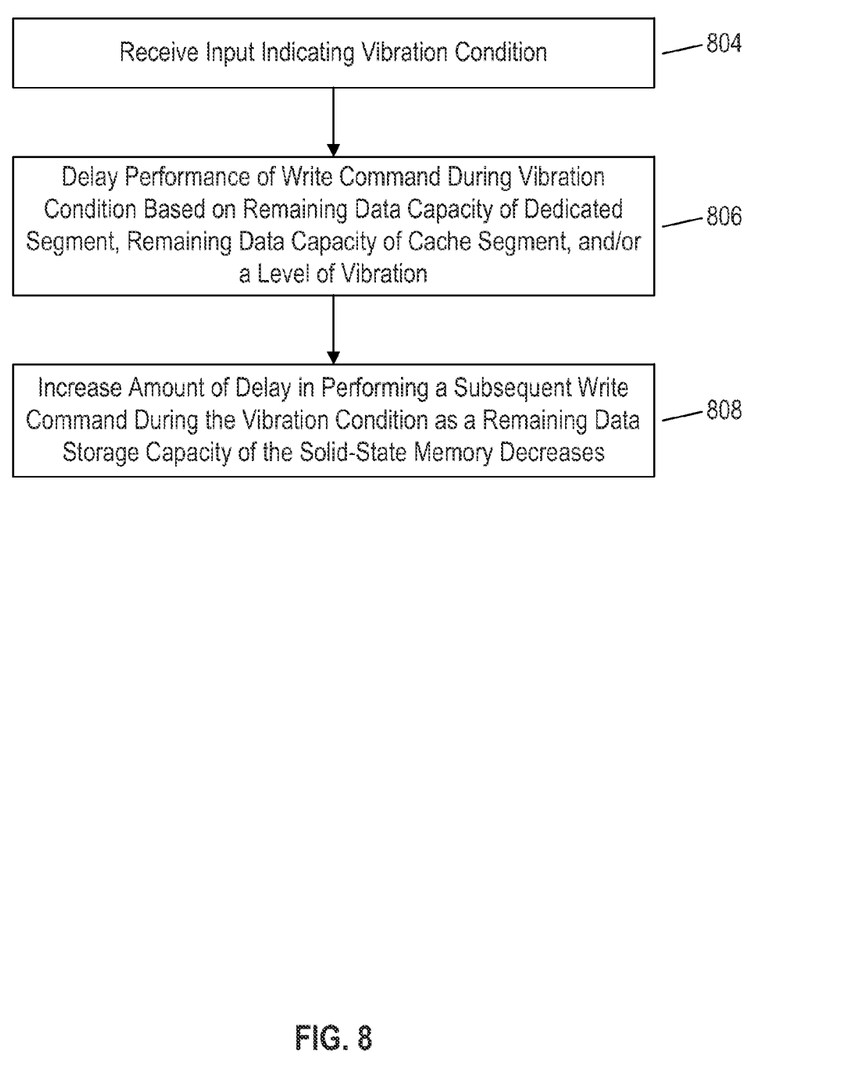
FIG. 8 is a flowchart for a throttling process for storing data during a vibration condition according to another embodiment.

FIG. 8 is a flowchart for a throttling process that can be performed by controller 120 for storing data during a vibration condition according to an embodiment. In block 804, controller 120 receives an input indicating a vibration condition such as from sensor 142 or from host 101.

In block 806, controller 120 delays performance of a write command during the vibration condition based on a remaining data capacity of dedicated segment 154, a remaining data capacity of cache segment 156, and/or a level or extent of vibration. In one implementation, controller 120 adjusts an initial or default amount of delay for performing the write command based on the remaining data capacity of dedicated segment 154 and a level of vibration. The level of vibration may be indicated by the input received in block 804 indicating the vibration condition such as by a value quantifying an amount of vibration sensed by sensor 142 or host 101. Higher levels of vibration can increase the amount of delay in an effort to prevent having to write data to disk 150. For example, the extent of vibration may only be considered after the remaining data storage capacity of dedicated segment 154 has reached the first threshold of FIG. 6 or is outside of the first threshold.

In block 808, controller 120 increases the amount of delay in performing a subsequent write command during the vibration condition as a remaining data storage capacity of solid-state memory 128 decreases. In this way, it is ordinarily possible to allow for a quicker performance of write commands while there is capacity available for storing data and then taper the speed of performing write commands as solid-state memory 128 or a portion thereof (e.g., dedicated segment 154 or cache segment 156) approaches its full capacity.

Figure 9:
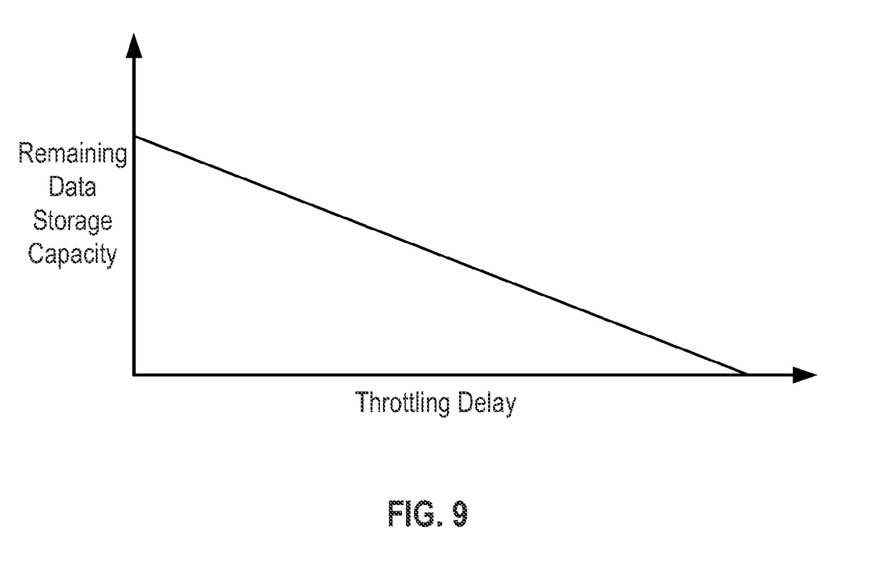
FIG. 9 is a graph depicting an increase in throttling delay as a remaining data storage capacity of a solid-state memory decreases according to an embodiment.

FIG. 9 is a graph depicting an increase in throttling delay as a remaining data storage capacity of solid-state memory 128 decreases according to an embodiment. The throttling delay may apply to only non-hinted write commands, hinted write commands, or both. In one implementation, the throttling delay or amount of delay in performing non-hinted write commands gradually increases as the remaining data storage capacity of dedicated segment 154 decreases. In other implementations, the throttling delay may increase for hinted and/or non-hinted write commands as the remaining data storage capacity decreases for cache segment 156 or for solid-state memory 128 as a whole. Although FIG. 9 depicts a generally linear increase in throttling delay as the remaining data storage capacity decreases, the granularity or steps of delay may differ in other embodiments such that the throttling delay increases with larger steps or with a different non-linear relationship to the remaining data storage capacity.

Figure 10:
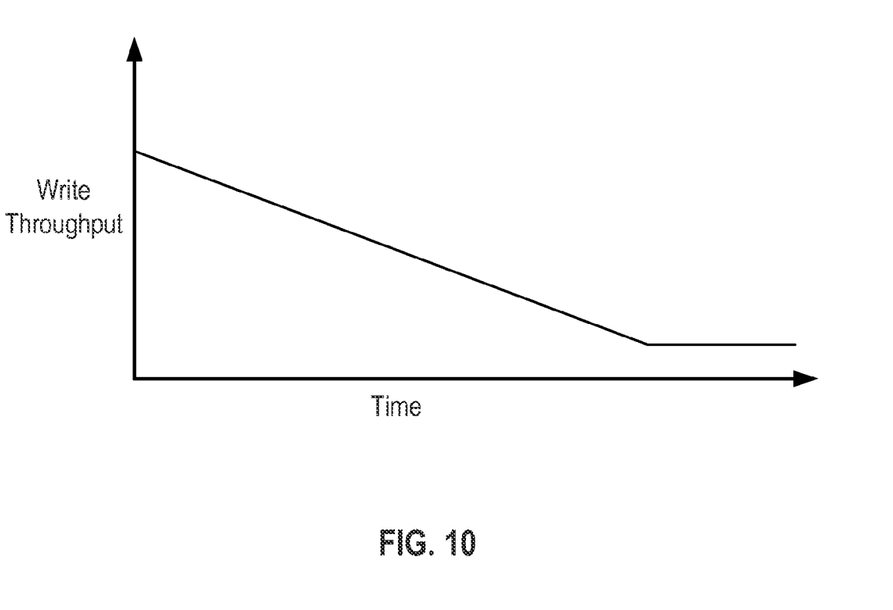
FIG. 10 is a graph illustrating a write throughput performance during a vibration condition according to an embodiment.

FIG. 10 provides a comparison of an example write throughput performance as the vibration condition persists. The write throughput represents an amount of writes that can be performed during a given time period. As shown in FIG. 10, the gradual throttling of write commands during a vibration condition allows for the performance of write commands to be gradually reduced to help avoid a sudden decline in the performance of write commands. The write throughput can be throttled down to a minimum write throughput as shown on the rightmost portion of FIG. 10. The minimum write throughput can be based on a particular performance specification or an available memory for queuing write commands.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   a disk for storing data;
   a solid-state memory for storing data, the solid-state memory including a cache segment and a dedicated segment for storing data during a vibration condition; and
   a controller configured to:
      receive an input indicating the vibration condition;
      receive a write command from a host to store data in the DSD;
      store at least a portion of the data for the write command in the dedicated segment of the solid-state memory based on the received input indicating a vibration condition for the DSD;
      determine whether an indication from the host indicates that data of the write command is to be stored in the solid-state memory;
      store the data of the write command during the vibration condition in the cache segment of the solid-state memory if it is determine that the indication from the host indicates that data of the write command is to be stored in the solid-state memory; and
      store the data of the write command during the vibration condition in the dedicated portion of the solid-state memory if it is determined that the indication from the host does not indicate that data of the write command is to be stored in the solid-state memory.

2. The DSD of claim 1, wherein the controller is further configured to:
   determine whether a remaining data storage capacity of the dedicated segment of the solid-state memory has reached or is outside of a first threshold; and
   redirect the storage of data for a subsequent write command during the vibration condition from the dedicated segment to the cache segment if it is determined that the remaining data storage capacity of the dedicated segment has reached or is outside of the first threshold.

3. The DSD of claim 2, wherein the controller is further configured to assign a low priority to the data redirected to the cache segment.

4. The DSD of claim 2, wherein the controller is further configured to:
   determine whether a remaining data storage capacity of the cache segment of the solid-state memory has reached or is outside of a second threshold; and
   redirect the storage of data for a second subsequent write command during the vibration condition from the cache segment to the disk if it is determined that the remaining data storage capacity of the cache segment has reached or is outside of the second threshold.

5. The DSD of claim 1, wherein the controller is further configured to delay performance of the write command during the vibration condition based on a remaining data storage capacity of the dedicated segment.

6. The DSD of claim 5, wherein the controller is further configured to increase an amount of delay in performing a subsequent write command during the vibration condition as the remaining data storage capacity of the dedicated segment decreases.

7. The DSD of claim 1, wherein the controller is further configured to:
    determine whether an indication from the host indicates that the data of the write command is to be stored in the solid-state memory;
    delay performance of the write command during the vibration condition with a first amount of delay if it is determined that the indication from the host indicates that the data of the write command is to be stored in the solid-state memory; and
    delay performance of the write command during the vibration condition with a second amount of delay if it is determined that the indication from the host does not indicate that the data of the write command is to be stored in the solid-state memory.

8. The DSD of claim 7, wherein the controller is further configured to adjust the first amount of delay based on a remaining data storage capacity of the dedicated segment of the solid-state memory.

9. The DSD of claim 7, wherein the controller is further configured to adjust the second amount of delay based on a remaining data storage capacity of the cache segment of the solid-state memory.

10. The DSD of claim 1, wherein the controller is further configured to delay performance of the write command during the vibration condition based on a level of vibration.

11. The DSD of claim 1, wherein the controller is further configured to block a synchronization of data between the solid-state memory and the disk during the vibration condition.

12. The DSD of claim 1, wherein the controller is further configured to:
    receive an input indicating an end of the vibration condition; and
    synchronize data between the dedicated segment of the solid-state memory and the disk based on the input indicating the end of the vibration condition.

13. The DSD of claim 1, wherein the controller is further configured to:
    interrupt performance of a write command to store data on the disk in response to receiving the input indicating the vibration condition; and
    store at least a portion of the data for the interrupted write command in the dedicated segment of the solid-state memory based on the received input indicating the vibration condition.

14. A method for storing data in a Data Storage Device (DSD) including a disk for storing data and a solid-state memory for storing data, the method comprising:
    receiving an input indicating a vibration condition for the DSD;
    receiving a write command from a host to store data in the DSD;
    storing at least a portion of the data for the write command in a dedicated segment of the solid-state memory based on the received input indicating the vibration condition;
    determining whether an indication from the host indicates that data of the write command is to be stored in the solid-state memory;
    storing the data of the write command during the vibration condition in a cache segment of the solid-state memory if it is determined that the indication from the host indicates that data of the write command is to be stored in the solid-state memory; and
    storing the data of the write command during the vibration condition in the dedicated segment of the solid-state memory if it is determined that the indication from the host does not indicate that data of the write command is to be stored in the solid-state memory.

15. The method of claim 14, wherein the method further comprises:
    determining whether a remaining data storage capacity of the dedicated segment of the solid-state memory has reached or is outside of a first threshold; and
    redirecting the storage of data for a subsequent write command during the vibration condition from the dedicated segment to the cache segment if it is determined that the remaining data storage capacity of the dedicated segment has reached or is outside of the first threshold.

16. The method of claim 15, further comprising assigning a low priority to the data redirected to the cache segment.

17. The method of claim 15, further comprising:
    determining whether a remaining data storage capacity of the cache segment of the solid-state memory has reached or is outside of a second threshold; and
    redirecting the storage of data for a second subsequent write command during the vibration condition from the cache segment to the disk if it is determined that the remaining data storage capacity of the cache segment has reached or is outside of the second threshold.

18. The method of claim 14, further comprising delaying performance of the write command during the vibration condition based on a remaining data storage capacity of the dedicated segment.

19. The method of claim 18, further comprising increasing an amount of delay in performing a subsequent write command during the vibration condition as the remaining data storage capacity of the dedicated segment decreases.

20. The method of claim 14, further comprising:
    determining whether an indication from the host indicates that the data of the write command is to be stored in the solid-state memory;
    delaying performance of the write command during the vibration condition with a first amount of delay if it is determined that the indication from the host indicates that the data of the write command is to be stored in the solid-state memory; and
    delaying performance of the write command during the vibration condition with a second amount of delay if it is determined that the indication from the host does not indicate that the data of the write command is to be stored in the solid-state memory.

21. The method of claim 20, further comprising adjusting the first amount of delay based on a remaining data storage capacity of the dedicated segment of the solid-state memory.

22. The method of claim 20, wherein the method further comprises adjusting the second amount of delay based on a remaining data storage capacity of the cache segment of the solid-state memory.

23. The method of claim 14, further comprising delaying performance of the write command during the vibration condition based on a level of vibration.

24. The method of claim 14, further comprising blocking a synchronization of data between the solid-state memory and the disk during the vibration condition.

25. The method of claim 14, further comprising:
    receiving an input indicating an end of the vibration condition; and synchronizing data between the dedicated segment of the solid-state memory and the disk based on the input indicating the end of the vibration condition.

26. The method of claim 14, further comprising:

interrupting performance of a write command to store data on the disk in response to receiving the input indicating the vibration condition; and storing at least a portion of the data for the interrupted write command in the dedicated segment of the solid-state memory based on the received input indicating the vibration condition.

27. A Data Storage Device (DSD), comprising:

a disk for storing data;

a solid-state memory for storing data, the solid-state memory including a cache segment and a dedicated segment for storing data during a vibration condition; and a controller configured to:
 receive an input indicating the vibration condition;
 receive a write command from a host to store data in the DSD;
 store at least a portion of the data for the write command in the dedicated segment of the solid-state memory based on the received input indicating a vibration condition for the DSD;
 determine whether a remaining data storage capacity of the dedicated segment of the solid-state memory has reached or is outside of a first threshold;
 redirect the storage of data for a subsequent write command during the vibration condition from the dedicated segment to the cache segment if it is determined that the remaining data storage capacity of the dedicated segment has reached or is outside of the first threshold; and
 assign a low priority to the data redirected to the cache segment.

28. A Data Storage Device (DSD), comprising:

a disk for storing data;

a solid-state memory for storing data, the solid-state memory including a cache segment and a dedicated segment for storing data during a vibration condition; and a controller configured to:
 receive an input indicating the vibration condition;
 receive a write command from a host to store data in the DSD;
 store at least a portion of the data for the write command in the dedicated segment of the solid-state memory based on the received input indicating a vibration condition for the DSD;
 determine whether a remaining data storage capacity of the dedicated segment of the solid-state memory has reached or is outside of a first threshold;
 redirect the storage of data for a subsequent write command during the vibration condition from the dedicated segment to the cache segment if it is determined that the remaining data storage capacity of the dedicated segment has reached or is outside of the first threshold;
 determine whether a remaining data storage capacity of the cache segment of the solid-state memory has reached or is outside of a second threshold; and
 redirect the storage of data for a second subsequent write command during the vibration condition from the cache segment to the disk if it is determined that the remaining data storage capacity of the cache segment has reached or is outside of the second threshold.

29. A method for storing data in a Data Storage Device (DSD) including a disk for storing data and a solid-state memory for storing data, the method comprising:

receiving an input indicating a vibration condition for the DSD;

receiving a write command from a host to store data in the DSD;

storing at least a portion of the data for the write command in a dedicated segment of the solid-state memory based on the received input indicating the vibration condition;

determining whether a remaining data storage capacity of the dedicated segment of the solid-state memory has reached or is outside of a first threshold;

redirecting the storage of data for a subsequent write command during the vibration condition from the dedicated segment to a cache segment of the solid-state memory if it is determined that the remaining data storage capacity of the dedicated segment has reached or is outside of the first threshold; and assigning a low priority to the data redirected to the cache segment.

30. A method for storing data in a Data Storage Device (DSD) including a disk for storing data and a solid-state memory for storing data, the method comprising:

receiving an input indicating a vibration condition for the DSD;

receiving a write command from a host to store data in the DSD;

storing at least a portion of the data for the write command in a dedicated segment of the solid-state memory based on the received input indicating the vibration condition;

determining whether a remaining data storage capacity of the dedicated segment of the solid-state memory has reached or is outside of a first threshold;

redirecting the storage of data for a subsequent write command during the vibration condition from the dedicated segment to a cache segment of the solid-state memory if it is determined that the remaining data storage capacity of the dedicated segment has reached or is outside of the first threshold;

determining whether a remaining data storage capacity of the cache segment of the solid-state memory has reached or is outside of a second threshold; and redirecting the storage of data for a second subsequent write command during the vibration condition from the cache segment to the disk if it is determined that the remaining data storage capacity of the cache segment has reached or is outside of the second threshold.

* * * * *